Figure 1:
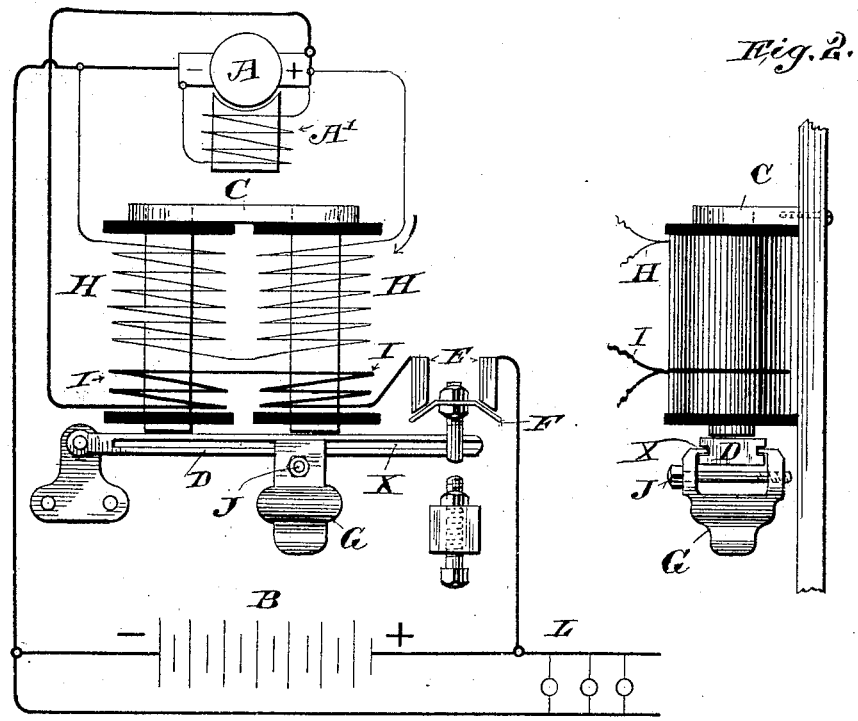

No. 706,083. Patented Aug. 5, 1902.
M. MOSKOWITZ.
AUTOMATIC SWITCH.
(Application filed Sept. 28, 1901.)
(No Model.)

WITNESSES

INVENTOR ature and discharge through the armature
UNITED STATES PATENT OFFICE.

MORRIS MOSKOWITZ, OF BROOKLYN, NEW YORK, ASSIGNOR TO JAMES H. YOUNG, TRUSTEE, OF NEW YORK, N. Y.

AUTOMATIC SWITCH.

SPECIFICATION forming part of Letters Patent No. 706,083, dated August 5, 1902.

Application filed September 28, 1901. Serial No. 76,842. (No model.)

*To all whom it may concern:*

Be it known that I, MORRIS MOSKOWITZ, a resident of the borough of Brooklyn, in the city and State of New York, have invented certain new and useful Improvements in Automatic Switches, of which the following is a specification accompanied by drawings.

The invention was devised for use in a car-lighting system in which the generator was driven from the car-axle, and was consequently subject to reversals in the direction of rotation and to variations in speed and in which a storage battery was employed for feeding the lighting-circuit when the generator was disconnected. When the generator was in use, it charged the battery as well as fed the lamps. Under such conditions it is highly desirable that the generator should be automatically connected with the circuits when the necessary speed and electromotive force are attained and automatically cut out from the circuit when the electromotive force of the generator is overpowered by the battery and the current begins to discharge in the reverse direction through the generator-armature.

Of course in the broader aspect of the invention the switch is applicable generally to a variety of uses, and particularly to generators subject to change of electromotive force and working in connection with a separate source of electromotive force which is liable to reverse the current in the generator-armature and discharge through the armature if the electromotive force of the generator falls too low. I have selected for illustration the switch as adapted to and combined in a car-lighting system with a storage battery for feeding the lights when the generator is disconnected.

Figure 1 is a schematic or diagrammatic drawing of the portions of the system directly concerned in the present invention, but showing the automatic switch in full. Fig. 2 is an end view showing the switch-arm in cross-section, but the retracting-weight and the electromagnet in full.

A is the generator-armature, and A' the field-magnet, shown, for example, self-excited. B is the storage battery, and L the lamp-circuit.

D is the switch-arm, preferably of magnetic material, so as to constitute an armature instead of requiring a separate armature for the electromagnet. The switch-arm is pivoted at one end and carries movable switch-contacts F at its other end. It is provided with slots X, which form guides for the retracting-weight G, which fits the guides, as shown, and may be clamped to the guides by a bolt or screw J, the resiliency of the weight itself allowing sufficient movement of the jaws to permit the clamping. The adjustment of the weight along the arm varies, the retracting force acting against the attraction of the magnet. The fixed switch-contacts E are included in circuit in series with the series windings I of the electromagnet and the armature A of the generator, so that when the generator is connected in circuit by the contacts F the current flows through the series coils I and the contacts E F E and divides it to supply the lamp-circuit L and charge the battery B, thence returning to the negative brush of the generator. The magnet-coils C are preferably of the type shown, and upon them are wound both the series coils I and the shunt-coils H, the latter being connected to the respective brushes of the generator.

The operation of the device is as follows: Supposing the switch to be opened and the generator not in use and then supposing the generator to be gradually started from a state of rest, the current in the magnet-coils H gradually builds up until it is sufficient to attract and raise the armature or switch-arm D and close the circuit at F. The adjustable retracting-weight G enables the apparatus to be adjusted so that this will occur when the generator has developed the necessary electromotive force to overcome that of the battery B. As soon as the circuit is closed at F the generator supplies the lamp-circuit and also charges the battery, and the series coils I then carrying the current insure the maintaining of the contacts closed at F—that is to say, the coils I are wound so as to add to and not oppose the magnetic effect of the coils H. If now the speed or electromotive force of the generator decreases until it falls below that of the battery, then the battery tends to discharge in the reverse direction through the coils I and armature of the generator. A very small difference in electromotive force between the battery and the armature is of course sufficient to cause the discharge of a large current from the battery through the coils I, and these acting to deënergize the electromagnet C allow the retracting-weight G to draw down the switch-arm D and break the circuit at F, disconnecting the generator. The switch therefore constitutes means of connecting and disconnecting the generator automatically at the proper moments.

For the sake of clearness I have omitted various regulating devices which are generally applied to such a system to maintain a constant potential in the lamp-circuit L and have also omitted certain other accessory devices that would not aid to an understanding of the invention.

The characteristic features that distinguish the invention are stated in the following claim:

The combination with the series and shunt wound electromagnet of a pivoted switch-arm actuated by the said electromagnet and provided with guides for a weight, and a weight fitted to said guides and sliding thereon and having integral with it two clamping-jaws and a clamp-screw by which it may be fixed in position thereon.

Signed this 27th day of September, 1901, at New York, N. Y.

MORRIS MOSKOWITZ.

Witnesses:
E. VAN ZANDT,
H. S. MORTON.